(12) United States Patent
Shahar (10) Patent No.: US 9,746,565 B2
(45) Date of Patent: Aug. 29, 2017

(54) SYSTEMS AND METHODS FOR REDUCING POLARIZATION IN IMAGING DETECTORS

(71) Applicant: General Electric Company, Schenectady, NY (US)

(72) Inventor: Arie Shahar, Moshav Magshimim (IL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/994,895

(22) Filed: Jan. 13, 2016

(65) Prior Publication Data

US 2017/0199286 A1    Jul. 13, 2017

(51) Int. Cl.
*G01T 1/24*    (2006.01)

(52) U.S. Cl.
CPC .............. *G01T 1/24* (2013.01); *G01T 1/249* (2013.01)

(58) Field of Classification Search
CPC ............... G01J 3/28; G01T 1/24; G01T 1/249
See application file for complete search history.

(56) References Cited

U.S. PATENT DOCUMENTS

| | | | |
|---|---|---|---|
| 5,905,772 A | 5/1999 | Rutten et al. |
| 6,268,614 B1 | 7/2001 | Imai |
| 6,373,064 B1 | 4/2002 | Yao et al. |
| 6,399,951 B1 | 6/2002 | Paulus et al. |
| 6,404,547 B1 | 6/2002 | Hull |
| 7,514,692 B2 | 4/2009 | Bouhnik et al. |
| 7,652,258 B2 | 1/2010 | Shahar et al. |
| 7,800,071 B2 | 9/2010 | Shahar et al. |
| 2005/0014995 A1 | 1/2005 | Amundson et al. |

(Continued)

FOREIGN PATENT DOCUMENTS

WO    2014132232 A2    9/2014

OTHER PUBLICATIONS

Fairley, Peter Douglas,"Novel solid state modulator for the infrared: the germanium chopper", Faculty of Engineering and applied Science Department of Electronics and Computer Science, A thesis submitted for the degree of Doctor of Philosophy, Jun. 2000; Chapter 2: Absorption process in semiconductors, pp. 5-33.

(Continued)

*Primary Examiner* — David Porta
*Assistant Examiner* — Faye Boosalis
(74) *Attorney, Agent, or Firm* — Dean D. Small; The Small Patent Law Group, LLC (57) ABSTRACT

A method is provided including acquiring detection events with a radiation detector that includes a semiconductor plate. Electrons and holes are generated in the semiconductor plate responsive to absorption of ionizing radiation. The holes including groups of holes having different effective masses for corresponding different valence energy bands. The method also includes optically coupling infrared (IR) radiation into the semiconductor plate of the radiation detector. The IR radiation has at least one wavelength selected from a spectral range including wavelengths to which the semiconductor plate is partially transparent. The wavelengths of the IR radiation are configured to excite at least some of the holes from a first group at a first valence energy band to a second group at a second valence energy band, with the holes of the second group having lower effective masses than corresponding holes of the first group.

22 Claims, 3 Drawing Sheets

(56) References Cited

U.S. PATENT DOCUMENTS

| | | |
|---|---|---|
| 2006/0076500 A1 | 4/2006 | Watanabe |
| 2006/0289776 A1 | 12/2006 | Gagnon et al. |
| 2008/0164418 A1 | 7/2008 | Shahar et al. |
| 2008/0315106 A1 | 12/2008 | Buchinsky |
| 2013/0108019 A1 | 5/2013 | Tkaczyk et al. |
| 2014/0061486 A1* | 3/2014 | Bao .................. G01J 3/0213 250/370.01 |

OTHER PUBLICATIONS

Rubio-Ponce, A. et al., "Calculation of the effective masses of II-VI semiconductor compounds"; Vacuum surfaces and 16 (2), pp. 26-28, Jun. 2003.

Lao, Y. F. et al., "Light-hole and heavy-hole transitions for high-temperature long-wavelength infrared detection", Applied Physics Letters 97, 091104, 2010.

Pezzoli, F. et al., "Optical spin injection and spin lifetime in Ge heterostructures", pp. 1-5.

International Search Report and Written Opinion for corresponding PCT Application No. PCT/US2017/013330 dated May 12, 2017; 14 pages.

\* cited by examiner

SYSTEMS AND METHODS FOR REDUCING POLARIZATION IN IMAGING DETECTORS

BACKGROUND

The subject matter disclosed herein relates generally to imaging systems, and more particularly to reducing polarization in imaging detectors.

In medical imaging, ionizing radiation detectors (e.g., detectors configured for detection of X-rays and/or Gamma-rays) may be used, for example, for high flux photon counting and medical imaging, which may also be referred to as molecular imaging (MI). For example, ionizing radiation detectors may be used for one or more of spectral-computed tomography (Spectral-CT or Color-CT, which is capable of counting photons and measuring their energy), single photon emission computed tomography (SPECT) in combination with CT (SPECT-CT), positron emission tomography (PET) combined with CT (PET-CT), or magnetic resonance imaging (MRI) combined with CT (MRI-CT).

In ionizing radiation detectors (e.g., CdZnTe (CZT) detectors) for high flux photon counting, such as used for example in Spectral-CT or Color-CT, a polarization effect may be produced by the formation of positive space charge in a detector. The space charge may reduce the internal electrical field in the detector, which may degrade performance of the detector. Degradation may also result by the attracting, by the positive space charge, of electrons toward a cathode, thereby reducing the drift of the electrons that should occur under ideal operation toward the anode via the detector bias (or internal field). Under relatively high flux of ionizing radiation, such as X-rays or Gamma-rays, a strong positive space-charge may be formed, which may cause the internal electrical field in the detector to collapse, resulting in cessation of operation of the detector.

When a detector is irradiated by relatively high ionizing radiation flux, the formation of a positive space charge may be mainly created by two causes. First, a positive space charge may be created due to ionization of long lifetime deep level hole traps. Second, a positive space charge may be created due to low or reduced mobility of holes that are outside of a hole trap. For example, each ionizing photon absorbed in the detector may create an electron-cloud and a holes-cloud. Under irradiation of a relatively high flux of ionizing photon, many electrons and hole clouds are formed in the detector by a large amount of ionizing photons absorbed in the detector. Due to low mobility of the hole clouds, the clouds are not collected by the cathode and instead remain in the detector bulk after most of the electrons clouds have been collected by the anodes. The hole clouds left in the detector bulk create a large positive space charge in the detector, which reduces the electrical field in the detector and attracts electrons toward the cathode, thereby degrading detector performance. While the use of relatively thin detectors with blocking cathodes operated at high bias voltage may improve hole drift velocity and detector performance while maintaining relatively low leakage current, further improvement is still desired, and such relatively thin detectors may be unsuited for use with Nuclear Imaging and X-ray applications due to their relatively low stopping power.

BRIEF DESCRIPTION

In accordance with an embodiment, a method is provided that includes acquiring detection events with a radiation detector. The radiation detector includes a semiconductor plate. The detector is configured to produce electrical signals in response to absorption of ionizing radiation in the semiconductor plate. Electrons and holes are generated responsive to absorption of the ionizing radiation. The holes including groups of holes having different effective masses for corresponding different valence energy bands. The method also includes optically coupling infrared (IR) radiation into the semiconductor plate of the radiation detector. The IR radiation has at least one wavelength selected from a spectral range including wavelengths to which the semiconductor plate is partially transparent. The wavelengths of the IR radiation are configured to excite at least some of the holes from a first group at a first valence energy band to a second group at a second valence energy band, with the holes of the second group having lower effective masses than corresponding holes of the first group.

In accordance with another embodiment, a radiation detector is provided. The radiation detector includes a semiconductor plate, an infrared (IR) radiation source, and at least one processor. The detector is configured to produce electrical signals in response to absorption of ionizing radiation in the semiconductor plate, wherein electrons and holes are generated responsive to absorption of the ionizing radiation. The holes include groups of holes having different effective masses for corresponding different valence energy bands. The IR radiation source is configured to provide IR radiation to the semiconductor plate. The at least one processor is operably coupled to the pixelated anodes, and is configured to provide IR radiation into the semiconductor plate from the IR radiation source. The IR radiation has at least one wavelength selected from a spectral range including wavelengths to which the semiconductor plate is partially transparent and which are configured to excite at least some of the holes from a first group at a first valence energy band to a second group at a second valence energy band. The holes of the second group have lower effective masses than corresponding holes of the first group.

In accordance with another embodiment, a tangible and non-transitory computer readable medium comprising one or more software modules configured to direct one or more processors to acquire detection events with a radiation detector. The radiation detector includes a semiconductor plate. The detector is configured to produce electrical signals in response to absorption of ionizing radiation in the semiconductor plate. Electrons and holes are generated responsive to absorption of the ionizing radiation. The holes including groups of holes having different effective masses for corresponding different valence energy bands. The one or more software modules are also configured to direct the one or more processors to optically couple infrared (IR) radiation into the semiconductor plate of the radiation detector. The IR radiation has at least one wavelength selected from a spectral range including wavelengths to which the semiconductor plate is partially transparent. The wavelengths of the IR radiation are configured to excite at least some of the holes from a first group at a first valence energy band to a second group at a second valence energy band, with the holes of the second group having lower effective masses than corresponding holes of the first group.

DETAILED DESCRIPTION

The foregoing summary, as well as the following detailed description of certain embodiments and claims, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As noted above, positive charge spaces may be created by the generation of hole traps having non-mobile holes, as well as reduced mobility of holes that are not in traps. For example, holes in a valence band may have varying effective masses, with the holes with higher effective masses having lower mobility and thus reducing detector performance. Thus, in contrast to previous approaches that may have only addressed holes in traps, various embodiments provide systems and methods that reduce polarization by increasing the mobility of holes in a valence band. In some embodiments, the number of holes in traps is also reduced to further improve detector performance. Various embodiments provide systems and methods that utilize a radiation detector (e.g., a CZT radiation detector) for high flux photon counting (e.g., Spectral-CT) with reduced polarization effects. Various embodiments provide systems and methods that utilize the same detector for Nuclear Imaging (NI) as well as MI or Spectral-CT, for example.

In various embodiments, the radiation detector may be thick enough to provide the stopping power needed in MI applications but still provide improved holes drift-velocity for reduced polarization. For maintaining the same drift time for the charge-carriers in the detector for various thicknesses, the high voltage bias of the detector may increase as the square of the detector thickness d, and the leakage-current may increase proportionally to the detector thickness. Accordingly, for maintaining high drift-velocity for the holes charge-carriers in the detector, as needed for high flux photon counting, and at the same time maintaining the detector as thick enough as needed for MI application, the leakage current in the detector may tend to become high enough to result in poor energy resolution. Accordingly, various embodiments provide for the conversion of holes having heavy effective-mass into lighter effective-mass to allow higher drift-velocity for the holes even in thick detectors (having lower internal electrical field) that will be beneficial for both, high flux photon counting, such as CT applications, and MI applications such as SPECT.

In various embodiments, in order to reduce the formation of the positive space-charge in the radiation detector, the holes' drift-velocity may be increased, by increasing the mobility of the holes. Increasing the holes mobility and drift-velocity allows the holes to be collected by the detector cathode during or shortly after the time in which most of the electron clouds have been collected by the detector anode. This ensures that most of the hole clouds will not be left in the detector bulk after the collection of the electron clouds, thereby preventing or reducing the formation of positive space-charge and the polarization effect.

Various embodiments increase the holes' mobility and drift-velocity by converting Heavy Holes (HH) into Light-Holes (LH) and Spin-Orbit or Split-Off Holes (SOH) for reducing the effective-mass of the holes, thereby increasing their mobility. The conversion of HH into LH may be produced by optical excitation of Near, Mid and/or Far Infra-Red (IR) radiation that excites electrons from the LH-band into the HH-band and from the spin-orbit band into the HH and LH bands. Such excitation of electrons is equivalent to the excitation or transition of holes from the HH-band into the LH-band and from the HH and LH bands into the spin-orbit band (SO) band. As used herein, the effective mass of a particle may be understood as the mass the particle seems to have when responding to forces, or the mass the particle seems to have when grouped with other identical particles. The effective mass of an electron or electron hole may be stated in units of true mass of the electron.

In the above mentioned process of converting HH into LH or SOH, the excitation of the electrons includes their transition from occupied states in the LH-band into unoccupied states in the HH-band, which may have been produced by the excitation of electrons from the HH-band into the conduction band by X-Rays or Gamma-Rays radiation. The unoccupied states of electrons in the HH band may also be produced by P-type doping of the semiconductor from which the radiation detector is made. In a degenerated state of P-type semiconductor the quasi Fermi-level $E_f$ is located inside the valence energy-band (or valence energy-bands) and thus parts of these bands (above the quasi Fermi-level $E_f$) may not be occupied by electrons and include the unoccupied electrons-states (or the states occupied by holes).

A technical effect of at least one embodiment includes improved image quality, especially at lower doses (e.g., due to correcting or addressing polarization). A technical effect of at least one embodiment includes reduced polarization. A technical effect of at least one embodiment includes improved flexibility allowing a radiation detector to be advantageously used with multiple different modalities. A technical effect of at least one embodiment includes better contrast, lower dose, and/or reduction or elimination of "after-glow" artifacts.

Figure 1:
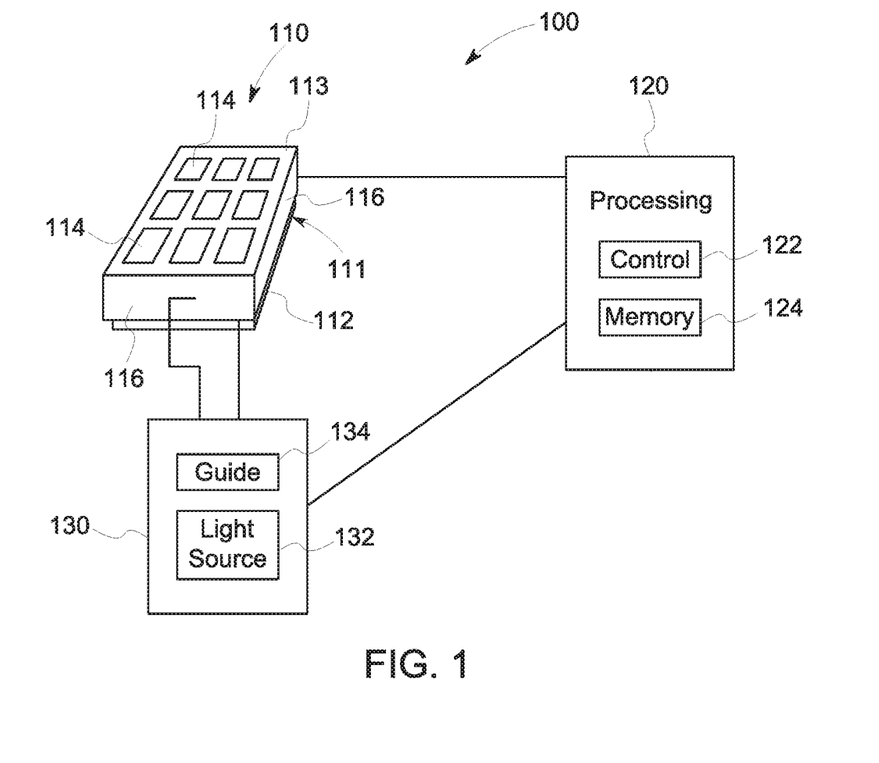
FIG. 1 provides a schematic view of a radiation detector assembly according to an embodiment.

FIG. 1 provides a schematic view of a radiation detector assembly 100 in accordance with various embodiments. As seen in FIG. 1, the radiation detector assembly 100 includes a semiconductor plate 110, a processing unit 120, and an infrared (IR) radiation source 130. Generally, the semiconductor plate 110 is configured to produce electrical signals in response to absorption of ionizing radiation in the semiconductor plate 110. Electrons and holes are generated responsive to absorption of the ionizing radiation. The holes include groups of holes having different effective masses for corresponding different valence energy bands. For example, a first group of holes may have a first effective mass (or range of effective masses) for a corresponding first valence energy band. A second group of holes may have a second effective mass (or range of effective masses) that is different from the first effective mass for a corresponding second valence energy band that is different from the first valence energy band. The IR radiation source 130 is configured to provide IR radiation to semiconductor plate 110. The processing unit 120 is operably coupled to the semiconductor plate 110, and is configured to provide IR radiation into the semiconductor plate 110 from the IR radiation source 130. The IR radiation may be utilized to convert holes from one valance band to another during the reception of ionizing radiation from an object being imaged. The IR radiation includes at least one wavelength selected (e.g., determined by the processing unit 120) from a spectral range including wavelengths to which the semiconductor plate 110 is partially transparent and which are configured to excite at least some of the holes (e.g., holes generated by the absorption of ionizing radiation by the semiconductor plate 110) from a first group at a first valence energy band to a second group of holes a second valence energy band. The holes of the second group have lower effective masses than corresponding holes of the first group. Thus, by converting the holes from the first group to the second group, hole mobility is increased and polarization is decreased.

The depicted semiconductor plate 110 includes a first surface 111, a second surface 113, sidewalls 116, a monolithic cathode electrode 112, and pixelated anode electrodes 114. In various embodiments, plural cathode electrodes may be employed instead of a monolithic cathode electrode. The first surface 111 is opposed to the second surface 113, with the sidewalls 116 interposed between the first surface 111 and the second surface 113 and extending therebetween. The monolithic cathode electrode 112 is disposed on the first surface 111, and the pixelated anode electrodes 114 are disposed on the second surface 113. The IR radiation source 130 in various embodiments is configured to direct IR radiation into the semiconductor plate 110 via the sidewalls 116. Additionally or alternatively, the IR radiation source 130 may be configured to direct IR radiation into the semiconductor plate 110 via the monolithic cathode electrode 114. For example, the monolithic cathode electrode 114 may be at least partially transparent to the IR radiation provided by the IR radiation source 130. Additional discussion regarding the direction of IR radiation into a semiconductor plate or detector may be found in U.S. Pat. No. 7,800,071, issued Sep. 21, 2010 and entitled "Method, Apparatus, and System of Reducing Polarization in Radiation Detectors," the subject matter of which is incorporated herein in its entirety. The semiconductor plate 110 in various embodiments may be constructed using different materials, such as semiconductor materials, including Cadmium Zinc Telluride (CdZnTe), often referred to as CZT, Cadmium Telluride (CdTe), or other semiconductors having split valence energy bands. Generally, when radiation (e.g., one or more photons) impacts the pixelated anode electrodes 114, the semiconductor plate 110 generates electrical signals corresponding to the radiation being absorbed in the volume of the detector 110 plate. In the illustrated embodiment, the pixelated anode electrodes 114 are shown in a 3×3 array for a total of 9 pixelated anode electrodes 114; however, it may be noted that other numbers or arrangements of pixelated anodes may be used in various embodiments. Each pixelated anode electrode 114, for example, may have a surface area of 2.5 millimeters square; however, other sizes and/or shapes may be employed in various embodiments.

It may be noted that each pixelated anode electrode 114 may have associated therewith one or more electronics channels configured to provide signals to one or more aspects of the processing unit 120 in cooperation with the pixelated anodes. In some embodiments, all or a portion of each electronics channel may be disposed on the semiconductor plate 110. Alternatively or additionally, all or a portion of each electronics channel may be housed externally to the semiconductor plate 110, for example as part of the processing unit 120, which may be or include an Application Specific Integration Circuit (ASIC).

As discussed above, the IR radiation source 130 is configured to provide IR radiation to the semiconductor plate 110. In the depicted embodiment, the IR radiation source 130 includes a light source 132 and light guides 134 coupled to the light source 132. The light guides 134 are interposed between the light source 132 and the semiconductor plate 110 and guide light from the light source 132 to the semiconductor plate 110. The light guides 134, in various embodiments, may include one or more Bragg grating. In various embodiments, the IR radiation source 130 may include, for example, a $CO_2$ laser having two of its emission lines at 9.4 μm and 10.6 μm wavelengths.

As seen in FIG. 1, the depicted processing unit 120 is operably coupled to the semiconductor plate 110 (e.g., the pixelated anode electrodes 114 and/or associated electronic channels or processing circuitry), as well as the IR radiation source 130. The processing unit 120 is configured to, among other things, determine or otherwise select a wavelength of IR radiation to provide to the semiconductor plate 110 to convert holes generated by absorbed ionizing radiation from an object to be imaged from at least one valence band to at least one other valence band having lower effective mass (and improved mobility), and to control the IR radiation source 130 to provide the IR radiation at the determined wavelength (or wavelengths).

For example, as also discussed in connection with FIG. 2 below, in some embodiments the different valence energy bands may include a heavy-hole band corresponding to heavy-holes, a light-hole band corresponding to light-holes, and a spin-orbit band corresponding to spin-orbit-holes. The spin-orbit holes have lower effective masses than the light-holes, and the light-holes have lower effective masses than the heavy-holes. The processing unit 120 and the IR radiation source 130 are configured in various embodiments to provide the IR radiation to the semiconductor plate 110 to cause transition of at least one of: (1) at least some holes from a group corresponding to the heavy-hole band into holes of a group corresponding to the light-hole band; (2) at least some holes from a group corresponding to the heavy-hole band into holes of a group corresponding to the spin-orbit band; or (3) at least some holes from the group corresponding to the light-hole band into holes of the group corresponding to the spin-orbit band.

In various embodiments the processing unit 120 includes processing circuitry configured to perform one or more tasks, functions, or steps discussed herein. It may be noted that "processing unit" as used herein is not intended to necessarily be limited to a single processor or computer. For example, the processing unit 120 may include multiple processors, ASIC's and/or computers, which may be integrated in a common housing or unit, or which may distributed among various units or housings. It may be noted that operations performed by the processing unit 120 (e.g., operations corresponding to process flows or methods discussed herein, or aspects thereof) may be sufficiently complex that the operations may not be performed by a human being within a reasonable time period.

In the illustrated embodiment, the processing unit 120 includes a control module 122 and a memory 124. It may be noted that other types, numbers, or combinations of modules may be employed in alternate embodiments, and/or various aspects of modules described herein may be utilized in connection with different modules additionally or alternatively. For example, the processing unit 120 may include one or more modules configured to acquire data from the semiconductor plate 110 and to reconstruct one or more images using the acquired data. Generally, the various aspects of the processing unit 120 act individually or cooperatively with other aspects to perform one or more aspects of the methods, steps, or processes discussed herein.

In the illustrated embodiment, the depicted control module 122 is configured to determine one or more wavelengths of IR radiation to provide to the semiconductor plate 110 for improving the mobility of holes within a valence band. The control module 122 is also configured to control the IR radiation source 130 to provide the IR radiation to the semiconductor plate 110.

The memory 124 may include one or more computer readable storage media. Further, the process flows and/or flowcharts discussed herein (or aspects thereof) may represent one or more sets of instructions that are stored in the memory 124 for direction of operations of the radiation detection assembly 100.

Figure 2:
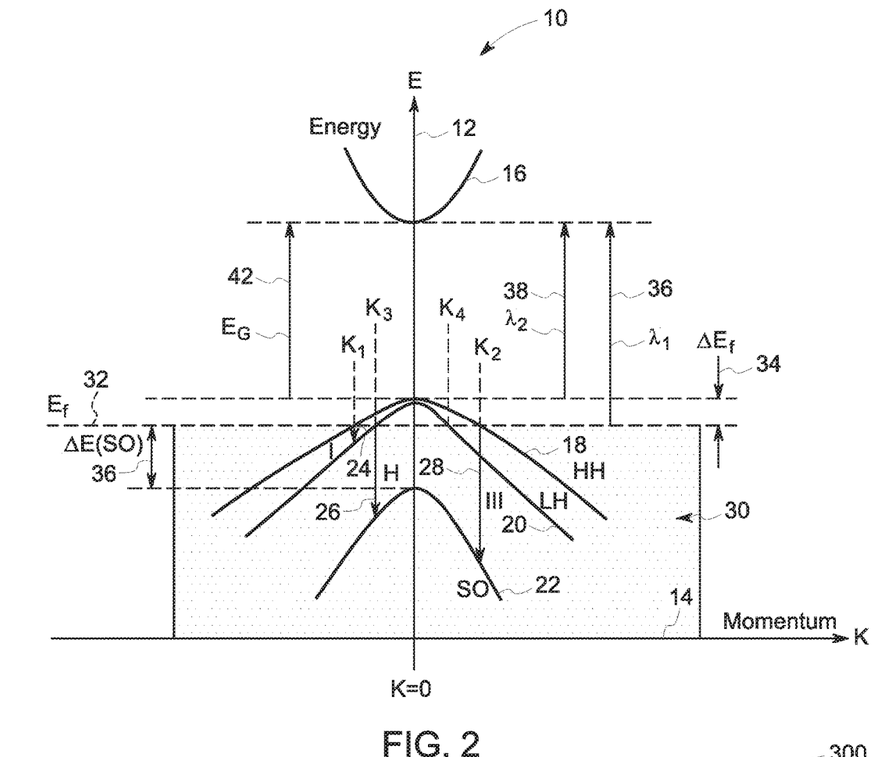
FIG. 2 illustrates an example of energies of various bands as a function of electron momentum.

FIG. 2 illustrates an example energy band structure 10. FIG. 2 schematically illustrates the electrons or holes energy-bands diagram of a semiconductor showing different possible transitions of holes between the split valence energy-bands (valence bands) of a semiconductor. It may be noted that the energy (electronic) band structure of CdTe and CdZnTe semiconductors is similar to the one of other semiconductors having Zinc blended crystals structures, such as Germanium. FIG. 2 schematically shows the electrons or holes energy-band structure 10 of a CdTe or CdZnTe (CZT) semiconductor, or other semiconductors having Zinc blended crystal structures. Energy band structure 10 depicted in FIG. 2 shows the energy E (12) of the bands as a function of the electron momentum K (14). The energy band structure 10 includes the conduction band 16, Heavy Holes (HH) valence band 18, Light Holes (LH) valence band 20 and Split-Off or Spin-Orbit (SO) valence band 22. In the specific example depicted in FIG. 2, the HH and LH bands 18 and 20, respectively are degenerate at momentum K=0 and have a common point there. In CdTe or CZT detectors, the SO band 22 may be separated from the HH band 18 at the vicinity of an electron momentum of K=0 by energy that is larger than the energy difference between the HH and the LH bands 18 and 20, respectively. The band structure of FIG. 2 depicts a situation when the CZT is a degenerate P-type semiconductor and thus the quasi Fermi-Level $E_f$(32) is inside the valence HH and LH bands.

As shown in FIG. 2, dotted area or region 30 schematically depicts the region that is fully occupied by electrons. Region 30, in its upper energy limit, reaches the quasi Fermi-Level $E_f$(32). Above quasi Fermi-Level $E_f$(32), the electrons or holes split valence bands are unoccupied by electrons (or occupied by holes). Thus, in the specific example shown by FIG. 2, HH and LH bands 18 and 20, respectively, are unoccupied by electrons (and are instead occupied by HH and LH, respectively) in the electron momentum range K between K=$K_1$ and K=$K_2$. It may be noted that in intrinsic or slightly N-type semiconductors, the quasi Fermi-Level $E_f$(32) is located near the mid energy-gap $E_G$ (42) between the HH band 18 and the conduction bands 16. In such a situation, none of the electrons or holes split valence bands 18, 20 and 22 are occupied with holes. However, even under the conditions mentioned above (i.e. intrinsic or slightly N-type semiconductor), HH band 18 may nevertheless include a portion with unoccupied states of electrons (or occupied states of HH) when the ionizing radiation has intensity that is high enough to excite enough electrons from HH band 18 to conduction band 16 for creating a quasi-equilibrium state in which HH band 18 is occupied by HH holes. Accordingly, for example under high flux of ionizing radiation, HH band 18 may be occupied by HH even when the semiconductor is an intrinsic semiconductor or even slightly N-type semiconductor. Accordingly, various embodiments may be employed for degenerate P-type, P-type, intrinsic, and/or slightly N-type semiconductors. It may be noted that the momentum range between K=$K_1$ and K=$K_2$ in which HH band 18 is occupied by HH may be determined, for example, based on the amount of doping of the semiconductor, the temperature of the semiconductor that determines the position of quasi Fermi-Level $E_f$ (32), and/or the intensity of the flux of the ionizing radiation.

As seen in FIG. 2, there are three possible transitions between the split bands of the valence band that may result in improved hole mobility. As depicted in FIG. 2, these three possible transitions are: (1) Transition 24, type I: transition of HH from the HH band 18 to the LH band 20 (HH→LH); (2) Transition 26, type II: transition of LH from the LH band 20 to the SO band 22 (LH→SO); (3) Transition 28, type III: transition of HH from the HH band 18 to the SO band 22 (HH→SO).

The following discussion below focuses on transition 24, type I (HH→LH transition); however, it should be understood that the general principles of the discussion regarding transition 24 generally applies to the other holes transitions, mentioned above, as well. The lifetime of holes excited from the HH band into the LH band is in the Pico-second (PS) range. Accordingly, the relaxation of holes from the LH-band back to the HH-band is almost unaffected by the recombination of electrons from the conductance-band to the LH-band since such transitions have a life time of 1 μs, which is much longer than the PS lifetime of the holes in the LH-band. In addition the direct transition from the conductance-band to the LH-band has very low probability.

According to the simplified electron energy band, the mathematical relations between the electron energy E(K) and its momentum K are given by:

$$E(K) = \frac{h'^2}{2m*} \cdot K^2 \qquad \text{Eq. (1)}$$

where E(K) is the electron energy in the energy band, h' is the reduced Plank constant h, h'=h/2π, m* is the effective-mass, and K is the electron momentum. Taking the second derivative of Eq. (1) and rearranging the equation gives the mathematical expression for the effective mass m*:

$$m* = h'^2 \Big/ \frac{d^2 E(K)}{dK^2} \qquad \text{Eq. (2)}$$

From Eq. (2) and FIG. 2, it can be seen that, around momentum K=0, HH band 18, which is the shallowest, has the lowest second derivative $$\frac{d^2 E(K)}{dK^2}$$

and thus has the highest effective-mass m*(HH). On the other hand, SO band 22, which is the steepest valence band in the vicinity of the electron momentum K=0, has the lowest effective-mass m*(SO). The effective mass of LH band 20 m*(LH) satisfies the mathematical relation:

$$m*(SO) < m*(LH) < m*(HH) \qquad \text{Eq. (3)}$$

It may be noted that, in A. Rubi-Ponce et. al. ("Calculation of Effective Masses of II-IV Semiconductor Compounds", Superficies Vacio 16(2), 26-28, Junio de 2003), the following values for the different effective-masses are reported for semiconductors having Zinc blended crystal structures: m*(HH) of 0.892, m*(LH) of 0.112, and m*(SO) of 0.508, where the values of effective-mass are given in units of electron free mass.

It may be seen that m*(LH) is about 8 times lighter than m*(HH), and that m*(SO) is about 2 times lighter than m*(HH). The value of these masses depends on the crystal orientation, which in the depicted case is [111], and on the value of the electrons momentum K. Accordingly, in this specific example, and unlike the situation when the electrons momentum K=0, m*(SO)>m*(LH). According to the specific example above, conversion of HH into LH by transition of holes from the HH band into the LH band (HH→LH) will reduce their effective mass m*(LH) by a factor of 8 relative to their initial mass m*(HH). Accordingly, the drift-velocity and mobility of the converted LH is about 8 times higher than the drift-velocity and mobility of the original HH. Similarly, conversion of HH into SOH by transition of holes from the HH band into the SO band (HH→SOH) will reduce their effective mass m*(LH) by a factor of 2 relative to their initial mass m*(HH). Accordingly, the drift-velocity and mobility of the converted SOH is about 2 times higher than the drift-velocity and mobility of the original HH.

It may be noted that the transition types I, II and III corresponding to transitions 24, 26 and 28 are all transitions of holes that move from a valence band with a certain effective-mass m* into another valence band with a smaller effective-mass m*. Accordingly, transitions 24 (HH→LH), 26 (LH→SO) and 28 (HH→SO) are all transitions that convert the initial effective-masses m*(HH), m*(LH) and m*(HH) of the holes in energy band 18, 20 and 18 into smaller effective-masses m*(LH), m*(SOH) and m*(SOH), respectively. Converting the effective-mass m* of the holes into smaller effective-mass m* increases the holes' mobility and their drift-velocity, resulting in reduction of the positive space-charge, thereby reducing polarization effects and detector performance degradation due to polarization.

For zinc blended crystals additional calculated information about the effective mass m* of the holes in the split valence bands at temperature of 300K (as given by http://www.ioffe.ru/SVA/NSM/Semicond/GaN/bandstr.html?sm_au_=iMVVJ77F31nVH6 kN) is: effective hole masses (heavy holes—HH) is $m_{HH}$=1.3 $m_o$; effective hole masses (light holes—LH) is: $m_{LH}$=0.19$m_o$; and effective hole masses (split-off band—SOH) is $m_{SOH}$=0.33 $m_o$, where $m_o$ is the electron free mass.

In CZT, the mobility of the electrons is about 10 times higher than that of the heavy holes HH. From the data above, it may be seen that the effective mass m* of the HH may be converted into lighter effective mass that is about 6 to 8 times lighter than the effective mass of the HH. Accordingly, such conversion of HH into LH may convert the mobility of the HH into a mobility that is similar to the mobility of the electrons. In such a situation, when a CZT radiation detector is irradiated by high flux of ionizing radiation, little or no space charge is produced in the detector bulk since all or most of the holes may drift fast enough to be collected by the cathode during the similar time that it takes to all the electrons to be collected by the anodes. Accordingly, few or no holes are left in the detector bulk shortly after the collection of the electrons is completed such that little or no space charge is produced, resulting in small or no polarization effect in the detector.

In various embodiments, conversion of HH into LH or SOH, and/or the conversion of LH into SOH may be achieved via optical excitation of holes from the HH-band 18 into the LH or the SO bands 20 or 22, respectively, or by excitation of LH from LH band 20 into SO band 22. Such conversion may reduce the mass of the holes by a factor of 6 to 10, for example, thereby increasing the mobility of the holes. Increasing the holes-mobility reduces the positive space-charge of holes left in the detector bulk immediately after the electrons of the signal have already been collected by the detector-anodes. The positive space charge produced in a CZT detector operating under high-flux is reduced by the improved mobility of the holes, via the conversion of holes from HH into LH, for example, reducing the holes effective mass m* and increasing the velocity of the holes, thereby facilitating the holes to be collected by the cathode.

The wavelength suitable to produce optical excitation of HH from the HH band into the LH or SO bands and from LH band into the SO band may be found, for example, experimentally by measuring the absorption of the semiconductor from which the radiation detector is made. Such a spectrum may be capable of producing transitions of the types I, II and III corresponding to transitions 24, 26 and 28, such that transitions 24 (HH→LH), 26 (LH→SO) and/or 28 (HH→SO) are achieved in which holes moves from a valence band with a certain effective-mass m* into another valence band with a smaller effective-mass m*.

Next, the spectral range from which the wavelength(s) may be selected will be discussed. As indicated above, such a spectrum having wavelengths corresponding to the momentum range starting at K=0 and ending at K=K1, depends on the doping type, doping amount of the semiconductor (the location of the quasi-Fermi level $E_f$ (32) inside the split valence bands, which is the degenerate amount of the semiconductor affecting the optical absorption by the Burstein-Moss shift effect), the element composition of the semiconductor, the intensity of the ionizing radiation impinging on the radiation detector, and/or the detector temperature, for example. The penetration of quasi-Fermi level $E_f$(32) into the HH band is measured by energy units and is equal to $\Delta E_f$(34), which may be derived by measuring the Burstein-Moss shift (the difference in the absorbed wavelengths $\lambda_1$ and $\lambda_2$ corresponding to the optical absorption, by transitions 36 and 38 of electrons from the HH valence band 18 to conduction band 16 under the situations when the semiconductor is degenerate and non-degenerate, respectively). $\Delta E_f$ is given by:

$$\Delta E_f = \left(\frac{hC}{\lambda_1} - \frac{hC}{\lambda_1}\right) \quad \text{Eq. (4)}$$

Where C is the speed of light. The momentum $K_1$ is the value of the electron momentum K when the energy E ($K_1$) of the HH band 18 (relative to the energy at momentum K=0) is equal to the energy of quasi-Fermi level $\Delta E_f$ (34) inside the HH band 18. Similarly, the momentum $K_3$ is the value of the electron momentum K when the energy E($K_3$) of the LH band 20 (relative to the energy at momentum K=0) is equal to the energy of quasi-Fermi level $\Delta E_f$ inside the LH band 20. Accordingly, from the analogy to Eq. (1), $K_1$ and $K_3$ can be derived from Eqs. (5a)-(5d):

$$E(K_1) = \Delta E_f = \frac{h'^2}{2m^*(HH)} \cdot K_1^2 \quad \text{Eq. (5a)}$$

Or $$K_1 = \sqrt{\frac{\Delta E_f \cdot 2m^*(HH)}{h'^2}} \quad \text{Eq. (5b)}$$

$$E(K_3) = \Delta E_f = \frac{h'^2}{2m^*(LH)} \cdot K_3^2 \quad \text{Eq. (5c)}$$

Or $$K_1 = \sqrt{\frac{\Delta E_f \cdot 2m^*(LH)}{h'^2}} \quad \text{Eq. (5d)}$$

When $K_1$ and $K_3$ are derived, the maximum transition energies (at momentum K=$K_1$ and K=$K_3$) between the split valence bands 18, 20 and 22 may be found. The maximum transition energies $\Delta E(HH \to LH)$, $\Delta E(LH \to SO)$, and $\Delta E(HH \to SO)$ corresponding to transitions of types I, II and III or transitions 24, 26 and 28, respectively, are given by the difference of the energies E(K) of the split valence bands 18, 20 and 22 at the electrons momentum K of the transitions, such as momentums $K_1$ and $K_3$. In the range of these values of the momentum K, the conditions for the transitions (HH→LH), (LH→SO), and (HH→SO) are satisfied (i.e., there are states occupied with holes in the valence band from which holes move to another energy band where there are vacant states of holes at the valance band that receives the holes).

$$\Delta E(HH \to LH) = \frac{h'^2}{2m^*(LH)} \cdot K_1^2 - \frac{h'^2}{2m^*(HH)} \cdot K_1^2 \quad \text{Eq. (6a)}$$

$$\Delta E(LH \to SO) = \Delta E(SO) + \frac{h'^2}{2m^*(SO)} \cdot K_3^2 - \frac{h'^2}{2m^*(LH)} \cdot K_3^2 \quad \text{Eq. (6b)}$$

$$\Delta E(HH \to SO) = \Delta E(SO) + \frac{h'^2}{2m^*(SO)} \cdot K_1^2 - \frac{h'^2}{2m^*(HH)} \cdot K_1^2 \quad \text{Eq. (6c)}$$

When $=\Delta E(SO)$ (40) is the split-off (spin-orbit) energy splitting between HH, LH bands and SO band at electrons momentum K=0. The shortest transition wavelengths $\lambda(HH \to LH)$, $\lambda(LH \to SO)$ and $\lambda(HH \to SO)$ corresponding to the maximum transition energies of Eq.(6a)-Eq.(6c) are given by:

$$\lambda(HH \to LH) = \frac{hC}{\Delta E(HH \to LH)} \quad \text{Eq. (7a)}$$

$$\lambda(LH \to SO) = \frac{hC}{\Delta E(LH \to SO)} \quad \text{Eq. (7b)}$$

$$\lambda(HH \to SO) = \frac{hC}{\Delta E(HH \to SO)} \quad \text{Eq. (7c)}$$

The longest transition wavelengths $\lambda(HH \to LH)$, $\lambda(LH \to SO)$ and $\lambda(HH \to SO)$ corresponding to the minimum transition energies of Eq.(6a)-Eq.(6c) in a situation when the momentum K=0 are given by:

$$\lambda(HH \to LH) = \text{approaching infinity} \quad \text{Eq. (8a)}$$

$$\lambda(LH \to SO) = \frac{hC}{\Delta E(SO)} \quad \text{Eq. (8b)}$$

$$\lambda(HH \to SO) = \frac{hC}{\Delta E(SO)} \quad \text{Eq. (8c)}$$

Accordingly, the spectral range of wavelengths for the various transitions $\lambda(HH \to LH)$, $\lambda(LH \to SO)$ and $\Delta(HH \to SO)$ are defined by the range between the shortest and longest wavelengths for each of the transitions as expressed by the set of equations {Eq. (7a)-Eq.(7c)} and {Eq. (8a)-Eq.(8c)}, respectively.

It may be noted that while theoretically the wavelength $\Delta(HH \to LH)$ may approach infinite value, in practice there is an upper-limit to this wavelength determined by the thermal excitation of holes from the HH band into the LH band. For small values of momentum K, the energy difference between the HH and LH bands is small, corresponding to long Δ(HH→LH). In this range, where the energy difference between the HH and the LH bands is small enough to allow efficient thermal excitation, the optical excitation may not be particularly efficient or useful. Accordingly, the upper limit for the value of λ(HH→LH) in various embodiments may be the value where this wavelength is less efficient than the thermal excitation of holes between the HH and the LH bands.

Alternatively to the calculations shown above, the spectral range of wavelengths for the various transitions λ(HH→LH), λ(LH→SO) and λ(HH→SO) may be derived experimentally using the above mentioned optical spectral-range by measuring the optical absorption corresponding to the wavelengths range of the relevant transitions between the split valence-bands.

In various embodiments, a rather high-intensity optical-excitation may be utilized at quite long wavelengths. Various embodiments may employ a $CO_2$ laser having two of its emission lines at 9.4 μm and 10.6 μm wavelengths. Such lasers may be commonly available, relatively low in price, and relatively high in power.

From equation (2) above, it may be seen that the effective mass m* is proportional $$1 \Big/ \frac{d^2 E(K)}{d K^2}.$$

This means that the larger is the second derivative $$\frac{d^2 E(K)}{d K^2},$$

the smaller is the effective mass m*. From FIG. 2, it may be seen that the larger change in the energy E(k) is in the vicinity of the region where the electron momentum K is close to zero, which means that the second derivative $$\frac{d^2 E(K)}{d K^2}$$

there is larger and the effective mass m* there is the smallest. On the other hand, at larger values of electron momentum K, the HH, LH and SO split valence bands have generally parallel curves, which are close to linear curves. This means that the holes in the HH, LH and SO split valence bands have the same small second derivatives $$\frac{d^2 E(K)}{d K^2}$$

there and thus the holes in these split valence bands, in such range of large electrons momentum K, have similar effective mass m*. Accordingly, it may be noted that the conversion of the effective mass m* from a large value into a smaller value, by the transitions (HH→LH), (LH→SO), and (HH→SO) may be done at relatively small electron momentum K, which means optical transitions λ(HH→LH), λ(LH→SO) and λ(HH→SO) are excited by relatively long wavelengths λ, such as the wavelength 9.4 and 10.6 μm provided by a $CO_2$ laser.

It may be noted such long wavelengths are not appropriate for earlier approaches which aimed to reduce the polarization by uniform ionization of holes in the deep-trap levels. For example, in a CZT semiconductor, the energy gap for 10% Zn CZT is about 1.48 eV. This means that the deep levels, which are located near the mid band-gap $E_G$ (42) of the CZT, are separated from the conductance band by energy of about 0.74 eV. Accordingly, the longest wavelength for ionizing such deep trapping levels is equal to 1.25/0.74=1.69 μm, which is far away from the wavelengths discussed herein to convert heavy holes into light holes by transitions between the split valence bands. It may further be noted that reducing the polarization by conversion of heavy holes into light holes may be performed by a completely different spectral range other than the spectral range that may be used to produce uniform ionization of the deep trap levels.

Accordingly, to achieve a complete or nearly complete reduction of the ionization effect in a semiconductor radiation detector, such as a CZT radiation detector irradiated by high flux of ionizing radiation, two different optical excitations with two different spectral ranges may be utilized. First, an optical excitation with the shorter wavelengths range should be used (e.g., as discussed in U.S. Pat. Nos. 7,652,258 and 7,800,071, which are hereby incorporated by reference in their entirety) for producing uniform space charge by ionizing deep level hole traps. For this purpose, the longest wavelength used may be in the range of 1.69 μm. Second, an optical excitation with much longer wavelengths may be used for efficient conversion of heavy holes into light holes. For this purpose, the wavelength range may start with wavelengths not shorter than 3.3-5 μm for the efficient conversions of LH into SOH (LH→SO) and not shorter than 5-16.5 μm for the conversions of HH into LH (HH→LH). Accordingly, the wavelength of the optical-excitation IR radiation may be selected from a range of wavelengths in the range between 3.3 μm and 16.5 μm in various embodiments.

It may be noted that conversion of HH into LH may be achieved much more efficiently by IR and FIR (far infrared) excitation relative to heating, and, unlike heating, optical excitation may be done without increasing the leakage-current of the radiation detector. The amount of free charge-carriers produced in a detector, by the intensity, such as used in diagnostic spectral CT, ($10^{10}$-$10^{11}$ photons/$cm^2$) of the ionizing radiation (X-Rays and Gamma Rays), and the short lifetime of the charge carriers in the split valence bands (in the range of PS) is such that the free carrier absorption in the radiation detector may be considered negligible. Accordingly, no significant heating of the detector will be produced by the IR or FIR radiation and the conversion of HH into LH, by the IR or FIR radiation is very efficient.

Next, the calculations of the steady-state density of HH produced by the high-flux X-Ray or Gamma-Rays radiation impinging on the CZT detector will be discussed. For example, in the case of photon counting spectral diagnostic CT, the X-Ray radiation intensity I is $10^{10}$ photons/($cm^2 \cdot sec$), and the steady-state density of HH produced by this intensity I of the high-flux X-Ray appears to be $9 \cdot 10^6$ holes/($cm^2$) (see Eq. (16) below).

In high-flux photon counting used for diagnostic CT, the radiation intensity is I=$10^{16}$ photons/($cm^2 \cdot sec$). This radiation produces holes in the HH valence-band by exciting electrons from this band to the conductance-band. The excited holes have a lifetime of $\tau_h$=0.05 μs. In case that the X-ray radiation is totally absorbed in the detector, the generation rate of holes χ is equal to the radiation intensity I times the average amount of electron-hole pairs that each photon produces. The energy pair-production for CZT is $E_p$=4.4 eV. The average energy $E_A$ of the photons emitted from the X-ray tube is about 80 KeV. Accordingly, the average amount of holes produced by each photon times the intensity I of the excitation ionizing radiation (Photons/ (cm²·sec) is the generation rate and is given by:

$$\chi = 1 \cdot \frac{E_A}{E_p} \approx 10^{10} \cdot \frac{80 \cdot 10^3}{4.4} \approx 10^{10} \cdot 1.8 \cdot 10^4 \quad \text{Eq. (9)}$$
$$= 1.8 \cdot 10^{14} \text{ holes}/(\text{cm}^2 \cdot \text{sec})$$

In the case when none of the holes is collected by the cathode, the steady-state density of holes $N_h$ in the detector produced, by the X-Ray radiation, can be derived from the rate equation:

$$\chi - \frac{N_h}{\tau_h} = \frac{d(N_h)}{dt} \quad \text{Eq. (10)}$$

Or $$\frac{(\chi \tau_h - N_h)}{\tau_h} = -\frac{d(\chi \tau_h - N_h)}{dt} \quad \text{Eq. (11)}$$

Or $$\frac{dt}{\tau_h} = -\frac{d(\chi \cdot \tau_h - N_h)}{(\chi \cdot \tau_h - N_h)} \quad \text{Eq. (12)}$$

By integrating both sides of Eq. (12):

$$(\chi \cdot \tau_h - N_h) = A \cdot e^{-\frac{t}{\tau_h}} \quad \text{Eq. (13)}$$

Where A is an integration constant. From the initial conditions at t=0, $N_h$=0.

$$\chi \cdot \tau_h = A \quad \text{Eq. (14)}$$

Substituting the value of A from Eq. (14) into Eq. (13) yields:

$$N_h = \chi \cdot \tau_h \cdot \left(1 - e^{-\frac{t}{\tau_h}}\right) \quad \text{Eq. (15)}$$

In a steady-state t>>$\tau_h$ is satisfied and then:

$$N_h = \chi \cdot \tau_h = 1.8 \cdot 10^{14} \cdot 5 \cdot 10^{-5} = 9 \cdot 10^6 \text{ holes}/(\text{cm}^2) \quad \text{Eq.(16)}$$

This means that the X-ray radiation produces 9·10⁶ holes/ (cm²) in the HH-band. The transition of electrons from the LH-band to the conduction-band has very low probability. Also, the relaxation of electrons from the HH-band to the LH-band is very fast (PS). Thus it may be assumed that all the holes produced by the X-ray are located in the HH-band. The optical beam intensity to convert most of the HH, produced by the X-Ray radiation, into LH or SOH may be derived, by the calculations discussed below, to be equal to 0.07 Watt/cm²). Such intensity may readily be provided, for example, by a $CO_2$ laser that is capable of providing a high power Continuous-Wave (CW) or pulsed beam at wavelengths around 9.4 and 10.6 μm, which are suitable to excite holes from the HH-band to the LH-band and to convert the relatively heavy effective mass of the HH into much lighter effective mass of the LH.

In various embodiments, the conversion of HH into LH or SOH may be achieved by optical direct transition of electrons from the LH-band to the HH-band. In order to avoid the creation of space-charge in the semiconductor detector bulk during the irradiation of the detector by high flux ionizing radiation, most of the HH produced by the ionizing radiation may be converted into LH by the IR optical excitation. Following is a discussion of the calculation of the optical power needed to convert most of the HH produced by the X-Ray radiation into LH using IR optical excitation to produce transitions of electrons from the LH-band into the HH-band (transition of holes from the HH band into the LH band) according to an embodiment.

As discussed above, the hole-density in the HH-band is 9·10⁶ holes/(cm²). The lifetime of electrons in the HH-band prior to their relaxation back into the LH-band is $\tau_{e-HH}$=10⁻¹² sec. To convert most of the HH into LH, the number of electrons $N_e$ excited from the LH-band into the HH-band should be similar to the number of holes $N_h$ in the HH-band. Accordingly, from Eq. (16) it follows that:

$$N_e = N_h = 9 \cdot 10^6 \text{ electrons}/(\text{cm}^2) \quad \text{Eq. (17)}$$

Analogous to Eq. (16) above, for $N_\theta$:

$$N_e = \chi_e \cdot \tau_{e-HH} = 9 \cdot 10^6 \text{ electrons}/(\text{cm}^2) \quad \text{Eq. (18)}$$

Where $\chi_e$ is the optical excitation rate of electrons from the LH-band into the HH-band. The excitation rate $\chi_e$ is derived from Eq. (16) and is equal to:

$$\chi_e = \frac{N_e}{\tau_{e-HH}} = \frac{9 \cdot 10^6}{10^{-12}} = 9 \cdot 10^{18} \text{ electrons}/(\text{cm}^2 \cdot \text{sec}) \quad \text{Eq. (19)}$$

An optical beam of a $CO_2$ laser having a wavelength of 10.6 μm can excite electrons from the band-edge of the LH to the HH-band without exciting electrons from the HH-band to the conduction-band. Unlike the ionizing X-Ray radiation in which each photon produces many charge-carriers, each photon of the $CO_2$ laser excites only one electron. When assuming efficiency of 100% for the optical beam, then the number of photons per second per cm² $N_{ph}$ is equal to the electrons excitation rate $\chi_e$. Accordingly:

$$N_{ph} = \chi_e = 9 \cdot 10^{18} \text{ photonss}/(\text{cm}^2 \cdot \text{sec}) \quad \text{Eq. (20)}$$

The energy of each photon is:

$$E_{ph}(\text{eV}) = \frac{1.25}{\lambda(\mu m)} = \frac{1.25}{10.6} = 0.118 \text{ eV} \quad \text{Eq. (21)}$$

The total intensity of the optical beam is given by:

$$N_{ph} \cdot E_{ph}(\text{eV}) = 9 \cdot 10^{18} \text{ photonss}/(\text{cm}^2 \cdot \text{sec}) \cdot 0.118 \text{ eV} = \quad \text{Eq. (22)}$$
$$1.06 \cdot 10^{18} \text{ eV}/(\text{cm}^2 \cdot \text{sec}) = \frac{1.06 \cdot 10^{18}}{1.6 \cdot 10^{19}} = 0.066 \text{ Watt}/(\text{cm}^2)$$

The calculations above were made under ideal conditions, accordingly, the calculated power of 0.066 Watt/(cm²) represents the minimum optical intensity needed for the optical excitation. For example, in an example CT system, the length of the detectors arc may be about 80 cm. For 256 slice CT, the width of the detector arc that has 1 mm pixels size is 256×1 mm=2.56 cm. Accordingly the total detectors area S of the detectors is 80×2.56 cm²=204.8 cm². The total optical power OP needed to convert most of the HH into LH over all the detector area S is accordingly given by:

$$OP(Watt) = 0.066 \text{ Watt}/(cm^2) \cdot S((cm^2))$$
$$= 0.066 \cdot 204.8 = 13.51 \text{ Watt} \qquad \text{Eq. (23)}$$

Even though such optical power may be considered relatively high, it still may be easily provided by a commercially available $CO_2$ laser, which is a common and relatively low cost laser. Alternatively, the optical power may be provided by an array of such lasers.

It may be noted that the excitation optical power may advantageously satisfy several conditions. First, a spectral optical range may include wavelengths selected from a wavelength range ensuring efficient conversion of the holes' effective-mass into lighter effective mass. Such a wavelength range may be determined, as mentioned above, by the amount of doping of the semiconductor, the semiconductor composition, the temperature of the semiconductor that determines the position of quasi Fermi-Level $E_f$(32), and/or the intensity of the flux of the ionizing radiation. For CZT radiation detectors, the wavelength range, for example, may start with wavelengths of $\lambda$=3.3-5 μm and ends with wavelengths of $\lambda$=14-16.5 μm. Second, an optical intensity may be employed that ensures that the amount of holes, in the split valence bands for which the effective-mass was converted into lighter effective-mass, is similar to the amount of holes in the split valence bands that were generated by the ionizing radiation impinging of the radiation detector. For CZT radiation detectors, the calculations have been done under optimal conditions, thus in practice, the IR optical excitation-intensity may be equal or higher than the calculated value of 0.066 Watt/(cm²). It may be noted that this intensity is substantially higher than needed for producing uniform space charge by ionizing deep level hole traps. The relatively high intensity of the optical IR radiation used for the optical excitation according to various embodiments of the present disclosure is mainly due to the extremely short lifetime of holes (in the Pico second range) in the LH and SO bands.

Figure 3:
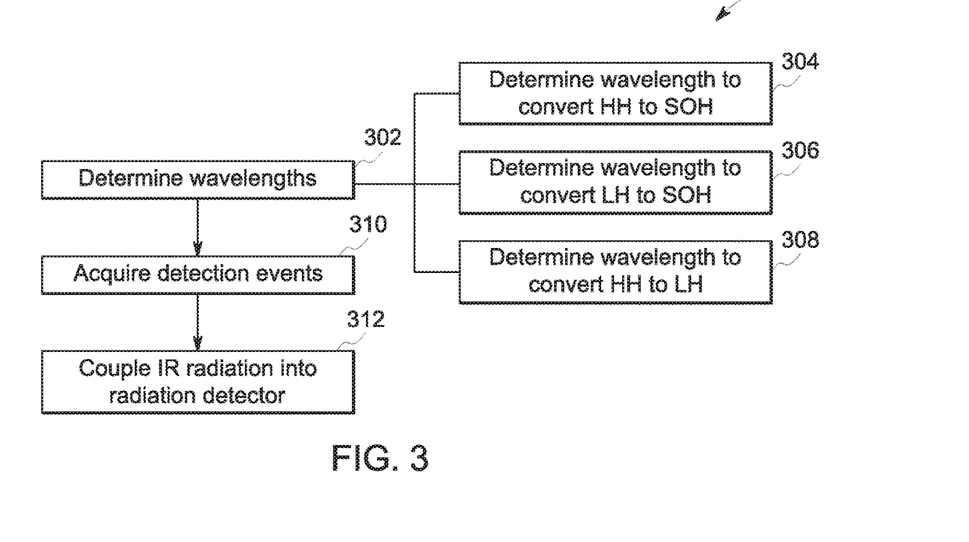
FIG. 3 shows a flowchart of a method, according to an embodiment.

FIG. 3 provides a flowchart of a method 300 in accordance with various embodiments. The method 300, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 300 may be able to be used as one or more algorithms to direct hardware (e.g., one or more aspects of the processing unit 120) to perform one or more operations described herein.

At 302, wavelengths are determined for converting a group of holes in a first valance band into at least one other group of holes in a different valance band having lower effective mass. The wavelengths may be determined as discussed herein, for example based on one or more of the doping type, doping amount of the semiconductor (the location of the quasi-Fermi level $E_f$ inside the split valence bands), the composition of the semiconductor, the intensity of the ionizing radiation impinging on the radiation detector, and/or the detector temperature, for example. In the illustrated embodiment, at 304, a wavelength or range of wavelengths is determined for converting heavy holes (HH) to spin-orbit holes (SOH). At 306, a wavelength or range of wavelengths is determined for converting light holes (LH) to spin-orbit holes (SOH). At 308, a wavelength or range of wavelengths is determined for converting HH to LH.

At 310, detection events are acquired with a radiation detector. For example, the radiation detector may include a semiconductor plate. The detector may be configured to produce electrical signals in response to absorption of ionizing radiation in the semiconductor plate, with electrons and holes are generated responsive to absorption of the ionizing radiation. The holes including groups of holes having different effective masses for corresponding different valence energy bands (e.g., HH, LH, and SOH). The detection events, for example, may correspond to one or more of photons that have passed through an object to be imaged as part of a CT scan or an emission from an object to be image as part of an NM scan.

At 312, infrared (IR) radiation is coupled into the semiconductor plate of the radiation detector. The IR radiation may have at least one wavelength (e.g., a wavelength selected at one or more of steps 302-308) selected from a spectral range including wavelengths to which the semiconductor plate is partially transparent and which are configured to excite at least some of the holes from a first group at a first valence energy band to a second group at a second valence energy band. The holes of the second group have lower effective masses than corresponding holes of the first group. For example, HH may be converted into LH and/or SOH, and/or LH may be converted into SOH in various embodiments. Accordingly, the conversion of holes from the first group to the second group reduces hole mass, increases hole mobility, and thereby reduces polarization effects. In some embodiments, the spectral range may include wavelengths in the range from 3 micrometers (μm) to 16.5 micrometers (μm). The IR radiation may be directed into the semiconductor plates via sidewalls and/or a monolithic cathode electrode that is at least partially transparent to the IR excitation radiation, for example, in various embodiments.

The IR radiation may be optically coupled into the semiconductor plate using a laser. For example, in the depicted embodiment, at 312, coupling the IR radiation into the semiconductor plate includes generating wavelengths of 9.4 micrometers (μm) and 10.6 micrometers (μm) with a laser. Such wavelengths may be substantially different from wavelengths used to address hole-traps.

Figure 4:
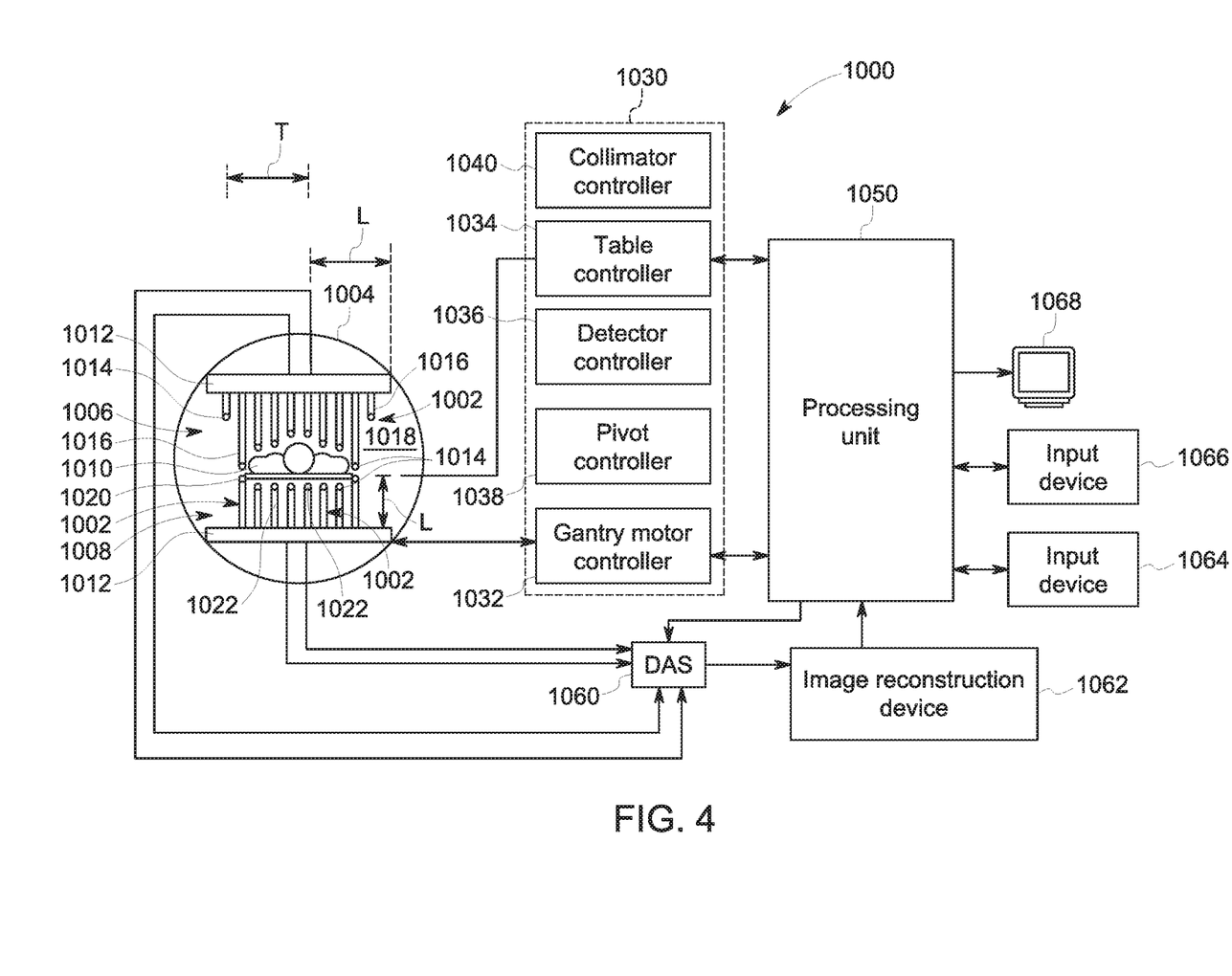
FIG. 4 shows a schematic view of an imaging system, according to an embodiment.

Various embodiments discussed herein and illustrated by FIGS. 1-3 may be implemented in medical imaging systems, such as, for example, SPECT, SPECT-CT, diagnostic CT, spectral CT, PET and PET-CT. In these cases, embodiments discussed herein may be part of the detection units of the systems mentioned above. It should be understood that while a radiation detector in accordance with some embodiments may be used either for CT or NM applications, still the very same detector may also be used for multiple applications, such as CT, spectral CT, diagnostic CT, SPECT, PET, SPECT-CT and PET-CT. Various methods and/or systems (and/or aspects thereof) described herein may be implemented using a medical imaging system. For example, FIG. 4 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). It should be noted that the arrangement of FIG. 4 is provided by way of example for illustrative purposes, and that other arrangements (e.g., detector arrangements) may be employed in various embodiments. In the illustrated example, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 4. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 4). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels (pixelated anodes). In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

The collimators 1022 (and detectors) in FIG. 4 are depicted for ease of illustration as single collimators in each detector head. Optionally, for embodiments employing one or more parallel-hole collimators, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 10). In various embodiments, the detector controller 1036 may control the detector carriers 1016 or the support members 1012 to move in different lateral directions. Detector controller 1036 may control the swiveling motion of detectors 1002 together with their collimators 1022. In some embodiments, detectors 1002 and collimators 1022 may swivel or rotate around an axis.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 4 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, for example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, patient table 1020, and/or collimators 1022 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

As used herein, the term "computer," "processor," or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "processor," or "module."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:
    acquiring detection events from at least one of X-ray or nuclear medicine (NM) emitted radiation with a radiation detector comprising a semiconductor plate, wherein the detector is configured to produce electrical signals in response to absorption of the at least one of X-ray or nuclear medicine (NM) emitted radiation in the semiconductor plate, wherein electrons and holes are generated responsive to the at least one of X-ray or NM emitted radiation, the holes including groups of holes having different effective masses for corresponding different valence energy bands; and
    optically coupling infrared (IR) radiation into the semiconductor plate of the radiation detector during the acquiring of the detection events from the at least one of X-ray or NM emitted radiation, the IR radiation having at least one wavelength selected from a spectral range including wavelengths to which the semiconductor plate is partially transparent and which are configured to excite at least some of the holes from a first group at a first valence energy band to a second group at a second valence energy band, wherein the holes of the second group have lower effective masses than corresponding holes of the first group.

2. The method of claim 1, wherein the spectral range includes wavelengths in the range from 3 micrometers (μm) to 16.5 micrometers (μm).

3. The method of claim 1, wherein optically coupling IR radiation into the semiconductor plate comprises generating wavelengths of 9.4 micrometers (μm) and 10.6 micrometers (μm) with a laser.

4. The method of claim 1, wherein the different valence energy bands include a heavy-hole band corresponding to heavy-holes and a light-hole band corresponding to light-holes, wherein the light-holes have lower effective masses than the heavy-holes, and wherein optically coupling IR radiation into the semiconductor plate comprises providing IR radiation configured to cause transition of at least some holes from a group corresponding to the heavy-hole band into holes of a group corresponding to the light-hole band.

5. The method of claim 1, wherein the different valence energy bands include a heavy-hole band corresponding to heavy-holes, a light-hole band corresponding to light-holes, and a spin-orbit band corresponding to spin-orbit-holes, wherein the spin-orbit holes have lower effective masses than the light-holes, wherein the light-holes have lower effective masses than the heavy-holes, and wherein optically coupling IR radiation into the semiconductor place comprises providing IR radiation configured to cause transition of at least one of:
- at least some holes from a group corresponding to the heavy-hole band into holes of a group corresponding to the light-hole band,
- at least some holes from a group corresponding to the heavy-hole band into holes of a group corresponding to the spin-orbit band, or
- at least some holes from the group corresponding to the light-hole band into holes of the group corresponding to the spin-orbit band.

6. The method of claim 1, wherein the semiconductor plate comprises a first surface, a second surface, and sidewalls, the first surface opposed to the second surface and the sidewalls interposed between the first surface and the second surface, wherein a monolithic cathode electrode is disposed on the first surface and pixelated anode electrodes disposed on the second surface, wherein optically coupling the IR radiation into the semiconductor plate comprises coupling the IR radiation into the semiconductor plate via the sidewalls.

7. The method of claim 1, wherein the semiconductor plate comprises a first surface, a second surface, and sidewalls, the first surface opposed to the second surface and the sidewalls interposed between the first surface and the second surface, wherein a monolithic cathode electrode is disposed on the first surface and pixelated anode electrodes disposed on the second surface, wherein optically coupling the IR radiation into the semiconductor plate comprises coupling the IR radiation into the semiconductor plate via the cathode electrode that is at least partially transparent to the IR radiation.

8. The method of claim 1, wherein the intensity of the IR radiation is selected based on at least one of detector temperature, amount of doping in the semiconductor plate, composition of the semiconductor plate, or intensity of the ionizing radiation.

9. The method of claim 1, wherein the intensity of the IR radiation is at least 0.066 watt/square centimeter.

10. The method of claim 1, wherein the radiation detector is a part of a detection unit in at least one of a CT system, diagnostic CT system, spectral CT system, SPECT system, SPECT-CT system, PET system, or PET-CT system.

11. The method of claim 1, wherein the radiation detector is used for both CT and SPECT imaging in a SPECT-CT system.

12. The method of claim 1, wherein the IR radiation is generated by a light source that is coupled to light guides.

13. The method of claim 12, wherein the light guides comprise a Bragg grating.

14. A radiation detector comprising:
a semiconductor plate, wherein the detector is configured to produce electrical signals in response to absorption of ionizing radiation from at least one of X-ray or nuclear medicine (NM) emitted radiation in the semiconductor plate, wherein electrons and holes are generated responsive to absorption of the ionizing radiation, the holes including groups of holes having different effective masses for corresponding different valence energy bands;
an infrared (IR) radiation source configured to provide IR radiation to the semiconductor plate; and
at least one processor operably coupled to the semiconductor plate, the at least one processor configured to provide IR radiation into the semiconductor plate from the IR radiation source during absorption of the ionizing radiation from the at least one of X-ray or NM emitted radiation, the IR radiation having at least one wavelength selected from a spectral range including wavelengths to which the semiconductor plate is partially transparent and which are configured to excite at least some of the holes from a first group at a first valence energy band to a second group at a second valence energy band, wherein the holes of the second group have lower effective masses than corresponding holes of the first group.

15. The radiation detector of claim 14, wherein the semiconductor plate comprises a first surface, a second surface, sidewalls, a monolithic cathode electrode, and pixelated anode electrodes, the first surface opposed to the second surface and the sidewalls interposed between the first surface and the second surface, the monolithic cathode electrode disposed on the first surface and the pixelated anode electrodes disposed on the second surface, wherein the IR radiation source is configured to direct the IR radiation into the semiconductor plate via the sidewalls.

16. The radiation detector of claim 14, wherein the semiconductor plate comprises a first surface, a second surface, sidewalls, a monolithic cathode electrode, and pixelated anode electrodes, the first surface opposed to the second surface and the sidewalls interposed between the first surface and the second surface, the monolithic cathode electrode disposed on the first surface and the pixelated anode electrodes disposed on the second surface, wherein the IR radiation source is configured to direct the IR radiation into the semiconductor plate via the cathode electrode.

17. The radiation detector of claim 14, wherein the IR source comprises a light source and light guides coupled to the light source.

18. The radiation detector of claim 17, wherein the light guides comprise a Bragg grating.

19. The radiation detector of claim 14, wherein the different valence energy bands include a heavy-hole band corresponding to heavy-holes, a light-hole band corresponding to light-holes, and a spin-orbit band corresponding to spin-orbit-holes, wherein the spin-orbit holes have lower effective masses than the light-holes, wherein the light-holes have lower effective masses than the heavy-holes, and wherein the at least one processor and the IR radiation source are configured to provide the IR radiation to cause transition of at least one of:
- at least some holes from a group corresponding to the heavy-hole band into holes of a group corresponding to the light-hole band,
- at least some holes from a group corresponding to the heavy-hole band into holes of a group corresponding to the spin-orbit band, or
at least some holes from the group corresponding to the light-hole band into holes of the group corresponding to the spin-orbit band.

20. A tangible and non-transitory computer readable medium comprising one or more software modules configured to direct one or more processors to:
acquire detection events from at least one of X-ray or nuclear medicine (NM) emitted radiation via a radiation detector comprising a semiconductor plate, wherein the detector is configured to produce electrical signals in response to absorption of the at least one of X-ray or NM emitted radiation in the semiconductor plate, wherein electrons and holes are generated responsive to the at least one of X-ray or NM emitted radiation, the holes including groups of holes having different effective masses for corresponding different valence energy bands; and optically couple infrared (IR) radiation into the semiconductor plate of the radiation detector during the acquiring of the detection events from the at least one of X-ray or NM emitted radiation, the IR radiation having at least one wavelength selected from a spectral range including wavelengths to which the semiconductor plate is partially transparent and which are configured to excite at least some of the holes from a first group at a first valence energy band to a second group at a second valence energy band, wherein the holes of the second group have lower effective masses than corresponding holes of the first group.

21. The tangible and non-transitory computer readable medium of claim 20, wherein the spectral range includes wavelengths in the range from 3 micrometers (μm) to 16.5 micrometers (μm).

22. The tangible and non-transitory computer readable medium of claim 20, wherein the different valence energy bands include a heavy-hole band corresponding to heavy-holes, a light-hole band corresponding to light-holes, and a spin-orbit band corresponding to spin-orbit-holes, wherein the spin-orbit holes have lower effective masses than the light-holes, wherein the light-holes have lower effective masses than the heavy-holes, and wherein optically coupling IR radiation into the semiconductor place comprises providing IR radiation configured to cause transition of at least one of:

at least some holes from a group corresponding to the heavy-hole band into holes of a group corresponding to the light-hole band, at least some holes from a group corresponding to the heavy-hole band into holes of a group corresponding to the spin-orbit band, or at least some holes from the group corresponding to the light-hole band into holes of the group corresponding to the spin-orbit band.

\* \* \* \* \*